(12) United States Patent
Monks et al.

(10) Patent No.: US 7,509,439 B2
(45) Date of Patent: Mar. 24, 2009

(54) METHOD FOR MAINTAINING REGISTER INTEGRITY AND RECEIVE PACKET PROTECTION DURING ULPI PHY TO LINK BUS TRANSACTIONS

(75) Inventors: Morgan Monks, Tempe, AZ (US); Bing Yup, Phoenix, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 442 days.

(21) Appl. No.: 11/044,446

(22) Filed: Jan. 27, 2005

(65) Prior Publication Data

US 2006/0168364 A1    Jul. 27, 2006

(51) Int. Cl.
G06F 3/00 (2006.01)
G06F 13/28 (2006.01)
G06F 12/00 (2006.01)

(52) U.S. Cl. .............................. 710/5; 710/22; 711/100
(58) Field of Classification Search ................ 710/5, 710/22
See application file for complete search history.

(56) References Cited

U.S. PATENT DOCUMENTS

| | | | | |
|---|---|---|---|---|
| 5,729,683 | A * | 3/1998 | Le et al. ...................... 709/237 |
| 6,205,493 | B1 * | 3/2001 | Dreyer et al. ................... 710/5 |
| 6,219,736 | B1 * | 4/2001 | Klingman .................... 710/315 |
| 6,499,077 | B1 * | 12/2002 | Abramson et al. ........... 710/305 |
| 6,742,071 | B1 * | 5/2004 | Boynton et al. ............. 710/305 |
| 6,871,241 | B2 * | 3/2005 | Fukae et al. ................... 710/15 |

2006/0069812 A1 * 3/2006 Osborne ......................... 710/5

OTHER PUBLICATIONS

"Introduction to the UTMI+ Low Pin Interface (ULPI)", Introduction to ULPI, v1.0, Mar. 1, 2004 (18 pages).
"On-The-Go Supplement to the USB 2.0 Specification", Revision 1.0a, Universal Serial Bus Specification Supplement, Jun. 24, 2003.
Compaq et al.; *Universal Serial Bus Specification*, Revision 2.0; Apr. 27, 2000, 650 pages.

* cited by examiner

*Primary Examiner*—Henry W. H. Tsai
*Assistant Examiner*—Michael Sun
(74) *Attorney, Agent, or Firm*—Meyertons Hood Kivlin Kowert & Goetzel, P.C.; Jeffrey C. Hood

(57) ABSTRACT

A system and method for protecting register write operations, especially register write operations performed in a USB PHY. A USB transmitter/receiver, operable to receive a register write command from a USB LINK device, may monitor the write sequence initiated by the register write command to determine if/when the register write sequence has been interrupted. In monitoring the register write sequence, the USB transmitter/receiver is operable to discard the register write command if a DIR signal issued by the USB transmitter/receiver is asserted during the register write sequence and/or if an STP signal received by the USB transmitter/receiver is asserted during the register write sequence, where STP may be part of a normal register write operation. The USB transmitter/receiver is further operable to allow the register write sequence to complete if the STP signal and the DIR signal are not asserted during a predetermined period of the register write sequence. The monitoring functions may be implemented in a finite state machine comprised in the USB transmitter/receiver.

26 Claims, 4 Drawing Sheets

METHOD FOR MAINTAINING REGISTER INTEGRITY AND RECEIVE PACKET PROTECTION DURING ULPI PHY TO LINK BUS TRANSACTIONS

BACKGROUND OF THE INVENTION

1. Field of the Invention

This invention relates to digital interface design, and more particularly, to designing a ULPI (UTMI+ Low Pin Interface).

2. Description of the Related Art

Within the past two decades personal computers (PC) have joined television sets, high fidelity stereo equipment, and compact disc players as part of the vast array of electronic devices widely used in both the office and the home. The Universal Serial Bus (USB) was developed to offer PC users an enhanced and easy-to-use interface for connecting an incredibly diverse range of peripherals to their computers. The development of the USB was initially driven by considerations for laptop computers, which greatly benefit from a small profile peripheral connector. Among the many benefits of the USB is a reduction in the proliferation of cables that can affect even the smallest computer installations. In general, USB has become the interface of choice for PCs because it offers users simple connectivity. USB eliminates the need to have different connectors for printers, keyboards, mice, and other peripherals, and supports a wide variety of data types, from slow mouse inputs to digitized audio and compressed video. In addition, USB devices are hot pluggable, i.e. they can be connected to or disconnected from a PC without requiring the PC to be powered off.

The USB specification has seen various revisions, with the USB 2.0 standard challenging the IEEE 1394 interface ("Firewire") as the interface of choice for high-speed digital video, among others. With the proliferating design of increasingly smarter, faster, and smaller peripherals, the On-The-Go (OTG) Supplement to the USB 2.0 Specification [Ref 2] was developed to address the growing popularity of the portable electronic devices market. Some of the advantages of the USB and OTG include the built-in support in form of more than 1.4 billion USB enabled PC's and peripherals shipped worldwide, smooth and trouble-free experience for the user through a compliance and logo program operated by the USB-IF, a wide variety of USB solutions such as intellectual property (IP) blocks, system-on-chip (SOC) parts, discrete chips, software drivers and systems offered by a large group of industry vendors, and design flexibility based on system needs.

OTG devices typically do not require a PC host, and can communicate directly with each other. For example, a PDA may act as a USB host with the capability to print directly to a USB printer, while also acting as a USB peripheral to communicate with a PC. In general, designers are facing increasing pressure to design smaller and faster products in less time and at lower cost. Concurrently, the introduction of smaller deep sub-micron processes present new challenges, such as integrating the physical layer (PHY—transceiver) analog circuitry required by technologies such as USB and OTG, leading to increased man-hours, fiscal and time investment, and silicon revisions. One way to increase time-to-market while keeping costs low is to provide the PHY in a separate chip. In such a case the designer can typically integrate most of the USB digital logic into the application specific integrated circuit (ASIC) in a small amount of time, and connect to a proven external PHY already available on the market.

Following the release of the USB 2.0 specification, Intel released the USB 2.0 Transceiver Macrocell Interface (UTMI) specification. UTMI defined an interface between two IP blocks: the USB Transceiver Macrocell (IP) and the USB Link layer (SIE). The signals for a UTMI interface with an 8-bit bi-directional data bus. Typically a minimum of 22 signals is required between the Link and the PHY for a device.

Subsequently, an extension of the original UTMI specification the UTMI+ specification was developed to meet the emerging need of building embedded host and OTG capabilities into USB devices. While the original UTMI specified an interface not meant to couple discrete ICs, the UTMI+ in essence introduced host and On-The-Go capabilities to USB systems. Using UTMI as a starting point, UTMI+ incrementally adds new functionality and interface signals to the Link and PHY. The additional signals total 33 for a full OTG UTMI+ interface. Designers can reuse all blocks from their original UTMI IP, and need only add the new circuits required for host or OTG support. This approach works well for UTMI+, as USB peripherals need only a subset of host and OTG functionality. UTMI+ introduced four levels of functionality, each higher level increasing the complexity required in both hardware and software while remaining completely backward compatible with lower levels.

More recently, a group of USB industry leaders developed a Low Pin Interface (LPI) UTMI+ specification, referred to as ULPI, in order to provide a low-cost USB and OTG PHYs by way of a low-pin, low-cost, small form-factor transceiver interface that may be used by any USB application. Pre-existing specifications, including UTMI and UTMI+ were developed primarily for Macrocell development, and were thus not optimized for use as an external PHY. Building upon the existing UTMI+ specification, the ULPI reduces the number of interface signals to 12 pins, with an optional implementation of 8 pins. As a result, the package size of PHY and Link IC's has generally been reduced, not only lowering the cost of Link and PHY IC's, but also reducing the required size of the associated printed circuit boards (PCBs). Central to the ULPI specification is the LPI, which is in effect a generic bus that defines a clock, three control signals, a bi-directional data bus, and bus arbitration. An introduction to ULPI has been published in March 2004.

Typically, a ULPI link will configure the ULPI PHY using register writes on a bi-directional shared data bus. The ULPI PHY is the arbitrator of the 8-bit data bus between the link and the PHY. As a result of certain events, for example a USB Linestate, OTG Vbus comparator, or IdDig plug, the PHY will typically assert the DIR signal and gain immediate access to the data bus. In such a situation, if a link write to the register array internal to the USB PHY is in progress, the data bus will not contain the data to write into the register array of the PHY. The ULPI specification does not directly describe this particular sequence of events, and offers no specific scenarios as to how this issue should be addressed. Generally, link vendors will build into their devices a way to detect the assertion of DIR and re-schedule another write to the ULPI PHY register. However, in the link re-scheduling a write, the correct data may not necessarily be written during the next write operation. In the USB protocol, unanticipated changes on DP/DM—caused by a write to the Function control register, for instance—may be misinterpreted on the other end of the USB bus leading to an unexpected state, which would interfere with proper operation of the USB devices on either end of the USB bus.

A ULPI link may also cause a register write operation that overlaps a USB receive event when the write cycle is terminated with the ULPI STP signal. In case the ULPI STP signal is asserted on the second cycle after the ULPI DIR is asserted, the ULPI PHY may interpret it to mean a LINK abort command. As a result of this action by the link, the incoming USB received packet may be lost and the link may be unaware that it has just aborted the PHY's USB receive. The STP signal is generally used as a means of ending the USB transmit. STP may be asserted once the complete transmit packet has been transferred into the ULPI PHY. An STP signal may also be used to end a ULPI register write. In debug mode, the STP signal may be used to abort a babbling USB device. This mode is typically not used in normal operation of the link and PHY. The ULPI 1.1 specification only requires that the PHY ignore an abort in the first cycle after a DIR signal has been asserted. In practice this may lead to unexpected register writes when in development. The link would have to combinatorially sample the state of the DIR signal before issuing an STP signal. Thus, the link would not issue the STP signal upon detecting the DIR signal. Without the STP signal the PHY would remain in the register write state waiting for the STP signal to be issued. However, requiring the link to sample the DIR signal would preclude the design of a clean synchronous interface to the PHY.

FIG. 1 shows a timing diagram of a ULPI register write operation. During normal operation the LINK drives a TXD CMD, in other words a register write on the bi-directional Data[7:0] bus at time T0. Bits 5:0 of this command byte contain the register address, which is the target of the register write command. Bit 7:6 of the command byte are decoded to determine if a USB Transmit, Register read, or Register write are to occur. At time T1 the ULPI PHY drives the NXT output, which the LINK detects at time T2, and then advances to drive the register data[n] byte. The LINK completes the write register transaction at time T3 when the STP is asserted. The ULPI PHY detects STP at time T4, and before the rising edge of the clock at time T5 the ULPI addressed register is updated.

Generally the ULPI PHY is the arbitrator of the bi-directional data bus. USB receive data typically has the highest priority. The ULPI PHY uses the DIR output to gain control of the data bus. This may result in a situation where an interrupt causes the ULPI PHY to report a status change via the RXD command byte to the LINK, or a USB receive occurs, causing USB data to be transferred to the LINK. A ULPI PHY may request the data bus due to one or more of the following changes:

LINESTATE change on USB BUS DP/DM
OTG Comparator Change due change in VBUS
ID pin state
Host Disconnect detection
USB Receive Start of Packet detection Any of the above conditions may occur at any time and may interrupt a register write operation already in progress. The ULPI specification contains specific information about how a register write may be interrupted. It does not unequivocally state however, how the PHY must behave with regards to the internal registers when a register write operation is interrupted.

FIG. 2 shows a timing diagram of an RXD command interrupting a register write operation. In other words, an RXD byte interrupt occurs when the LINK is writing to the internal register array. At time T1, the PHY asserts DIR to signal to the LINK that higher priority information is available. The bus turnaround cycle completes at time T2, and the PHY drives the RXD command byte. The LINK accepts the RXD command byte at clock edge T3. The PHY should not accept any write to the internal register array after the assertion of DIR. The LINK must re-try the write to the internal register array when DIR is de-asserted after time T4.

FIG. 3 shows a timing diagram of a ULPI register write immediately followed by a USB receive. In other words, a USB receive immediately follows a USB receive. Since the USB receive data is of higher priority than the register write, the ULPI PHY may assert DIR at time T3. The write in this case may complete since the STP signal asserts after time T3, and the PHY has already registered the register data at time T3. The USB receive starts at time T4 with an RXD command byte followed by the USB PID, which is received by the link at T5 followed by the remaining bytes of the packet.

FIG. 4 shows a timing diagram of a ULPI register write interrupted by a USB receive, where a USB receive occurs one cycle earlier than shown in FIG. 3. At time T2 the ULPI PHY asserts DIR due to a USB receive. The write register command is ignored since the data on the bus when STP is asserted is unknown. AT time T3 a ULPI bus turnaround cycle allows the PHY to drive the data bus after cycle T4.

Since the ULPI specification does not specifically describe how the PHY must behave with regards to the internal registers when a register write operation is interrupted, there exists a need for a system and method to protect the integrity of the internal registers during interrupted write operations.

Many other problems and disadvantages of the prior art will become apparent to one skilled in the art after comparing such prior art with the present invention as described herein.

SUMMARY OF THE INVENTION

Various embodiments of a system and method for protecting register write operations, for example register write operations performed within a USB PHY, are presented. In one embodiment, a USB PHY comprises a transmitter/receiver coupled to a data bus and a control signal bus, and a register array also coupled to the data bus. The data bus may be an 8-bit bus operating at a single data rate or it may be a 4-bit bus operating at a double-data rate. The control signal bus may be a 4-bit bus comprising USB control signals NXT, DIR, STP and a CLK signal.

In one embodiment, the transmitter/receiver is configured to monitor, upon receiving a register write command that targets the register array, a register write sequence initiated by the register write command, in order to determine if/when the register write sequence is interrupted. Upon determining that the register write sequence has been interrupted, the transmitter/receiver may perform one or more tasks, which may result in a discarding of the register write command or, alternately, completion of the register write sequence.

In one embodiment, the transmitter/receiver discards the register write command if a USB DIR signal issued by the transmitter/receiver is asserted during the write sequence. In addition, the transmitter/receiver may also discard the register write command if a USB STP signal received by the transmitter/receiver is asserted during the register write sequence. The transmitter/receiver may allow the write sequence to complete if the USB DIR signal issued by the transmitter/receiver and the USB STP signal received by the transmitter/receiver are not asserted during a predetermined period of the register write sequence.

In one set of embodiments the monitoring of the register write sequence may be performed through a finite state machine (FSM). The FSM may comprise three states, a register write idle state, a register write data state, and a register write complete state. The register write command may be discarded on an FSM transition from the register write data state to the register write idle state. Accordingly, the register write sequence may be allowed to complete on an FSM transition from the register write data state to the register write complete state, followed by an FSM transition from the register write complete state to the register write idle state.

Various embodiments of the system and method suggested by the present invention may allow a more robust development and debugging of USB physical layers (PHYs), by allowing users to find USB receive packets that may have been dropped by the USB PHY. Protecting register write operations according to various embodiments of the present invention may allow the USB LINK to see the packets but still abort one cycle later in the receive process.

Thus, various embodiments of the systems and methods described above may facilitate design of a system that protects register write operations, especially register write operations within USB PHY, which may be protected such that a disconnect or another unexpected state may not appear at the other end of the USB, thus preventing the other end of the USB bus to possibly go into Host Negotiation Protocol (HNP), or simply disconnect or suspend. Preferred embodiments, as described herein, may also protect against noise causing a write to a register within the USB PHY.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
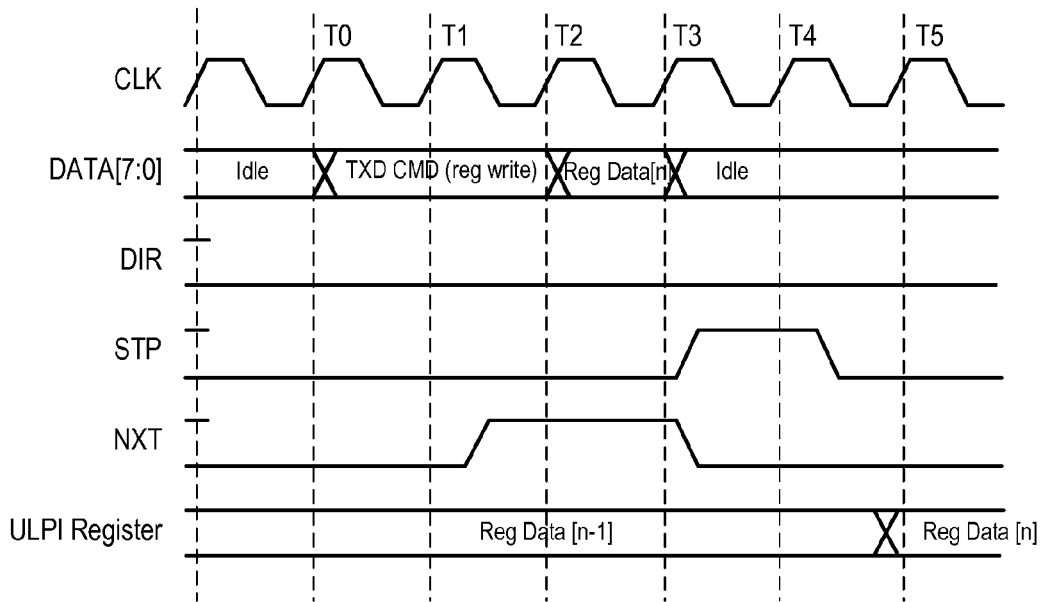
FIG. 1 shows a timing diagram of a ULPI register write operation according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

As used herein, a "trigger" signal is defined as a signal that is used to initiate, or "trigger", an event or a sequence of events in a digital system. A trigger signal is said to be in a "triggering state" at a time when it initiates a desired event, or sequence of events. A periodic trigger signal may commonly be referred to as a "clock". In a "synchronous" digital system, generally a clock, commonly referred to as a "system clock", may be used for initiating most events, or sequences of events. An example of a triggering state may be, but is not limited to, a rising edge of a pulse of a clock in a synchronous digital system. "Asserting" a signal refers to setting a level of the signal to a high logic level, whereas "deasserting" a signal refers to setting an output of the signal to a low logic level. It will be evident to those skilled in the art that a high logic level may be physically represented by either a high voltage or a low voltage, and similarly a low logic level may be physically represented by either a low voltage or a high voltage.

When referencing numbers, a leading 'b' in front of a numeric sequence indicates that a binary number follows. For example, 'b10' may refer to a 2-bit binary number, the MSB (most significant bit) of which is '1'. A number preceding the letter 'b' and separated by an apostrophe indicates the number of bits in the binary number that follows. For example, "8'b0" may refer to an 8-bit binary number with all eight bits being '0'. Similarly, "8'b10xx_xxxx" may refer to a binary number whose upper two bits comprise '10', with each one of the remaining bits comprising either a '1' or a '0'.

Figure 5:
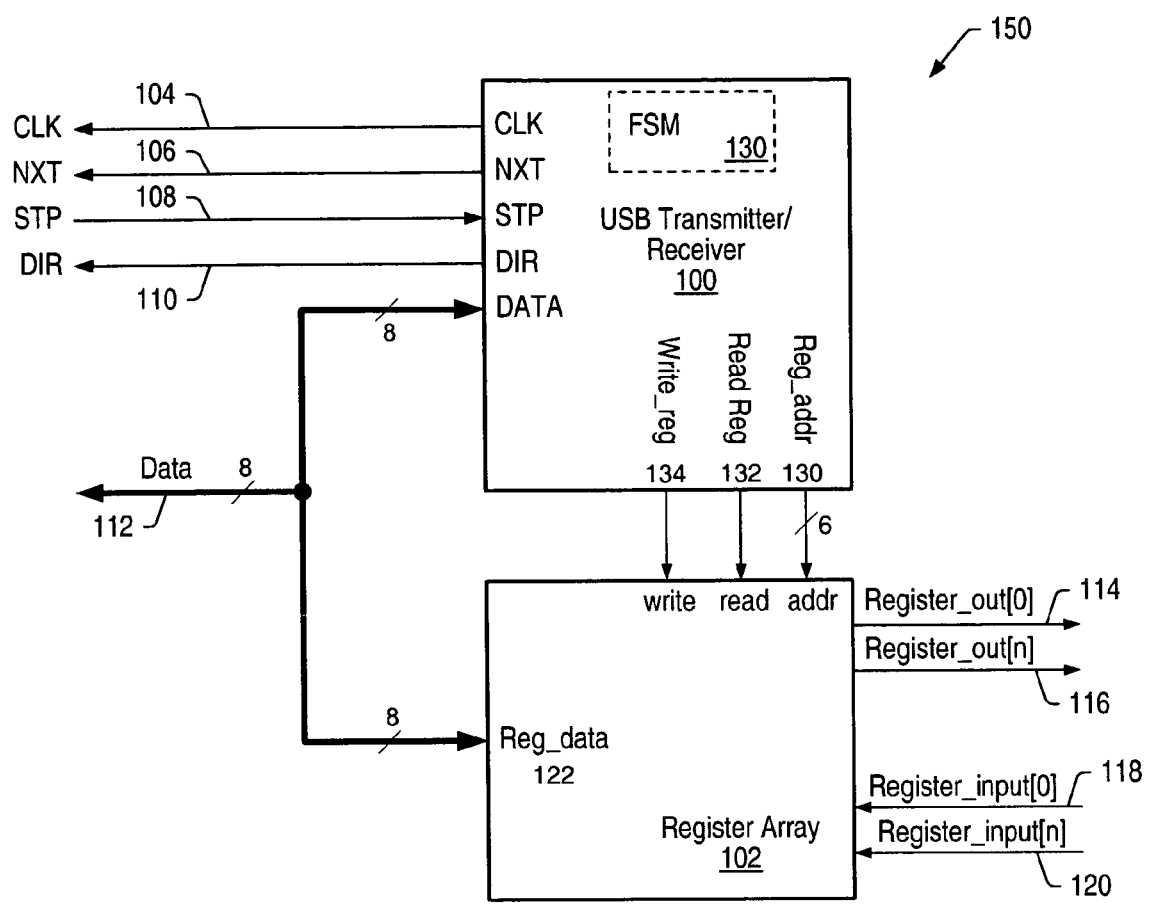
FIG. 5 shows a partial block diagram of a ULPI PHY according to one embodiment of the present invention.

A partial block diagram of a ULPI PHY 150 is illustrated in FIG. 5 according to one embodiment of the present invention. ULPI PHY 150 may use an internal array of registers 102 to set configuration bits that control its operation. PHY 150 may transmit and receive USB low speed, full speed and high speed data. It may also support signaling required by the USB 2.0 specification and the USB OTG supplement. A bi-directional data bus 112 may couple a LINK to PHY 150. Data bus 112 may carry command bytes to transmit USB data and may also carry USB received data and information bytes transferred to a LINK controller used to control the coupled LINK. In one embodiment, the configuration of static state input to ULPI PHY 150 is accomplished by transfers on bi-directional data bus 112 to internal register array 102.

The embodiment of ULPI PHY 150 shown in FIG. 5 comprises a 12-pin interface composed of 8-bit bi-directional data bus 112, output clock CLK 104, a flow control input STP 108, and flow control output NXT 106. Single data rate may be clocked on the rising edge of CLK 104, which may be a 60 MHz clock. An alternative embodiment may comprise an 8-pin interface using Double Data Rate (DDR) data transfers where data is transferred in 4-bit nibbles on rising and falling edges of CLK 104 through data bus 112, which in this case may be a 4-bit bus instead of an 8-bit bus. Alternate embodiments with a reduced or increased number of control signals and different size data buses are also possible and are contemplated. Since the coupled LINK may be required to configure PHY 150 by writing and reading internal registers 102, in order to maintain substantially error free operation of PHY 150 it may become necessary to protect the integrity of internal registers 102.

As previously indicated and illustrated in the timing diagram of FIG. 1, and now relating to PHY 150 of FIG. 5, during a standard write operation the LINK may issue a register write in form of a transmitted command byte (8-bit command) over bi-directional data bus 112 at time T0. Bits [5:0] of the command byte may contain a register address, which may represent the target register of the register write command. Bits [7:6] of the command byte may be decoded to determine if a USB Transmit, Register Read, or Register Write are to occur. At time T1, PHY 150 may drive NXT 106 output, which the LINK may detect at time T3, and then advance to drive register data byte Reg_data 122. The LINK may complete the Register Write transaction at time T4 when STP 108 becomes asserted. PHY 150 may detect STP 108 at time T5, and before the rising edge of clock 104 at time T6, the addressed register may be updated. PHY 150 may use DIR 110 output to gain control of data bus 112. This may result in a situation where an interrupt may cause PHY 150 to report a status change via an RXD (Receive Data) command byte over data bus 112 to the LINK, or a USB receive may occur causing USB data to be transferred to the LINK, interrupting a Register Write operation already in progress.

Referring again to FIG. 5, in one embodiment USB transmitter/receiver 100 includes a finite state machine (FSM) 130, which operates to maintain the integrity of the registers in register array 102. FSM 130 may operate to examine the complete Register Write cycles and determine when a write to register array 102 was interrupted. An actual write to the addressed register may take place using a clock that is four times faster than CLK 104, which is output from PHY 150. For example, if CLK 104 had a frequency of 60 MHz, the actual write to the addressed register would be clocked at 240 MHz. This would allow the complete write register transaction to complete before a decision was made.

Figure 2:
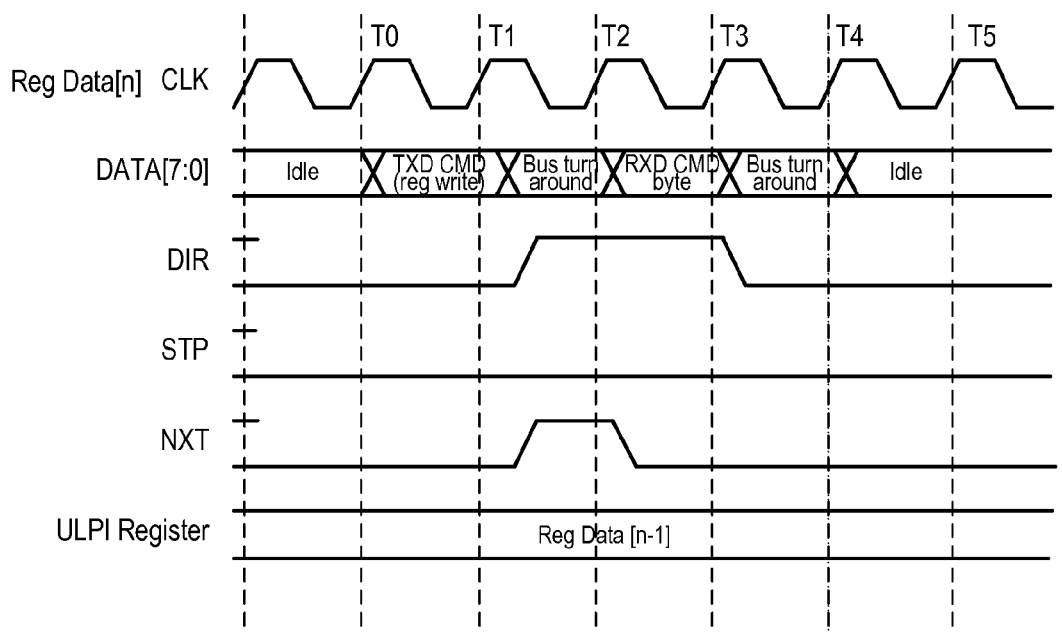
FIG. 2 shows a timing diagram of an RXD command interrupting a register write operation according to prior art.
Figure 3:
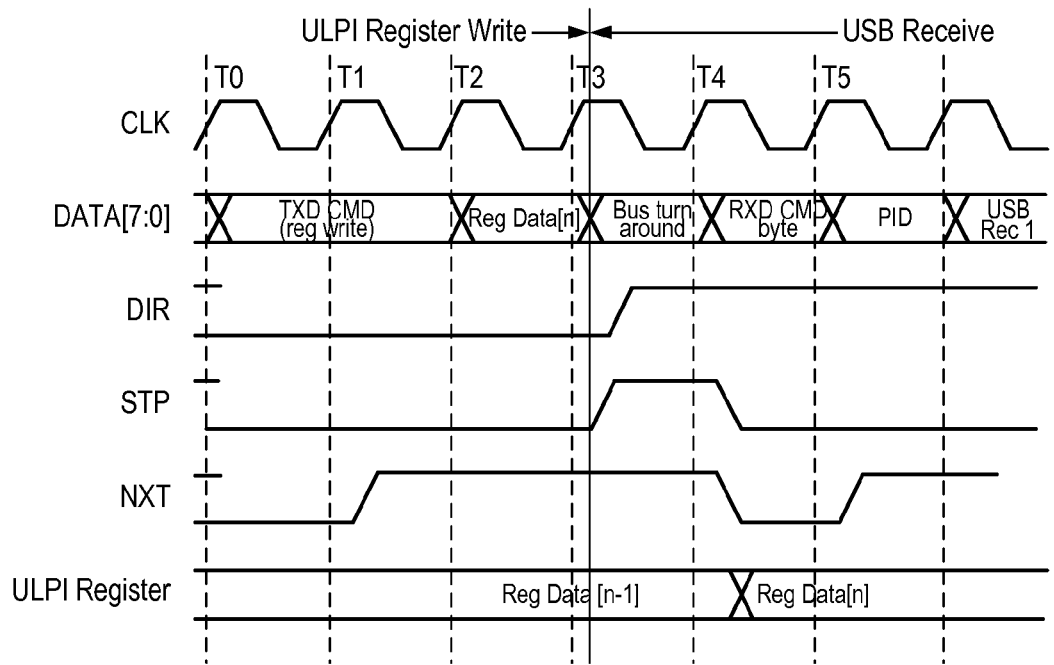
FIG. 3 shows a timing diagram of a ULPI register write immediately followed by a USB receive according to prior art.
Figure 4:
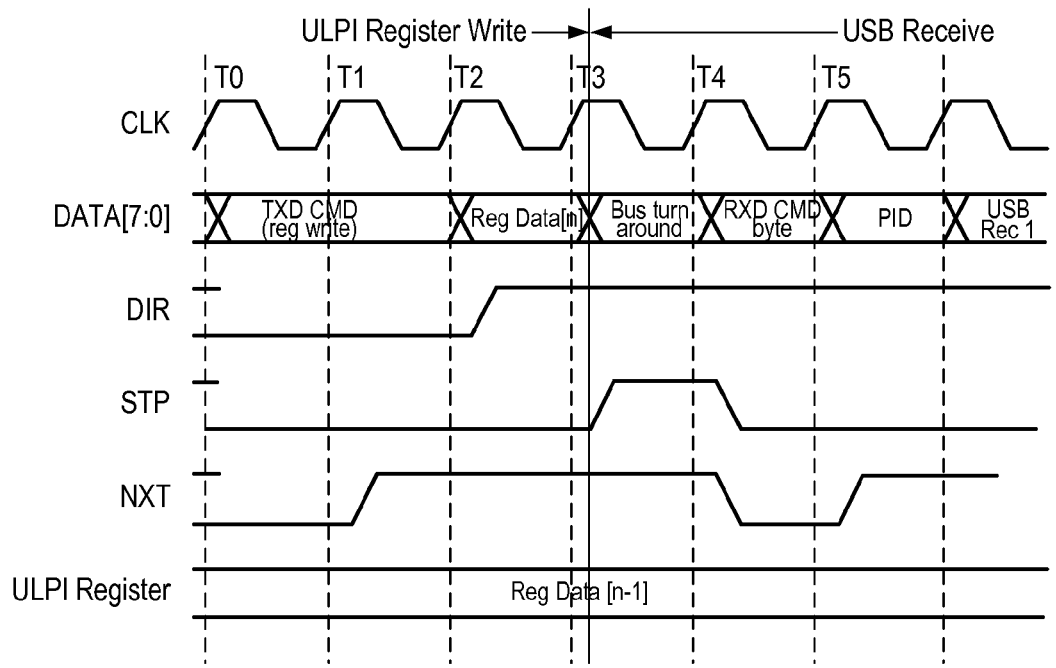
FIG. 4 shows a timing diagram of a ULPI register write interrupted by a USB receive according to prior art.

For the Register Write operations shown in the timing diagrams of FIG. 2, FIG. 3, and FIG. 4, and according to one set of embodiments, FSM 130 may operate to prevent the Register Write. More specifically, for the case illustrated in FIG. 2 and according to one embodiment, the Register Write may be prevented by assessing the state of the DIR 110 signal internal to PHY 150, and logically AND-ing its inverse value with the value of the Register Write signal that is being sent over data bus 112. For the cases illustrated in FIG. 3 and/or FIG. 4, and according to another embodiment, the entire write sequence may be monitored, more specifically, USB transmitter/receiver 100 may monitor DIR signal 110 via FSM 130 during a determined period of the write sequence, and if DIR signal 110 is not asserted during the determined period of observation then the Register Write may be allowed to occur. Should DIR signal 110 be asserted during the determined period of the write sequence, the write command may be discarded.

Figure 6:
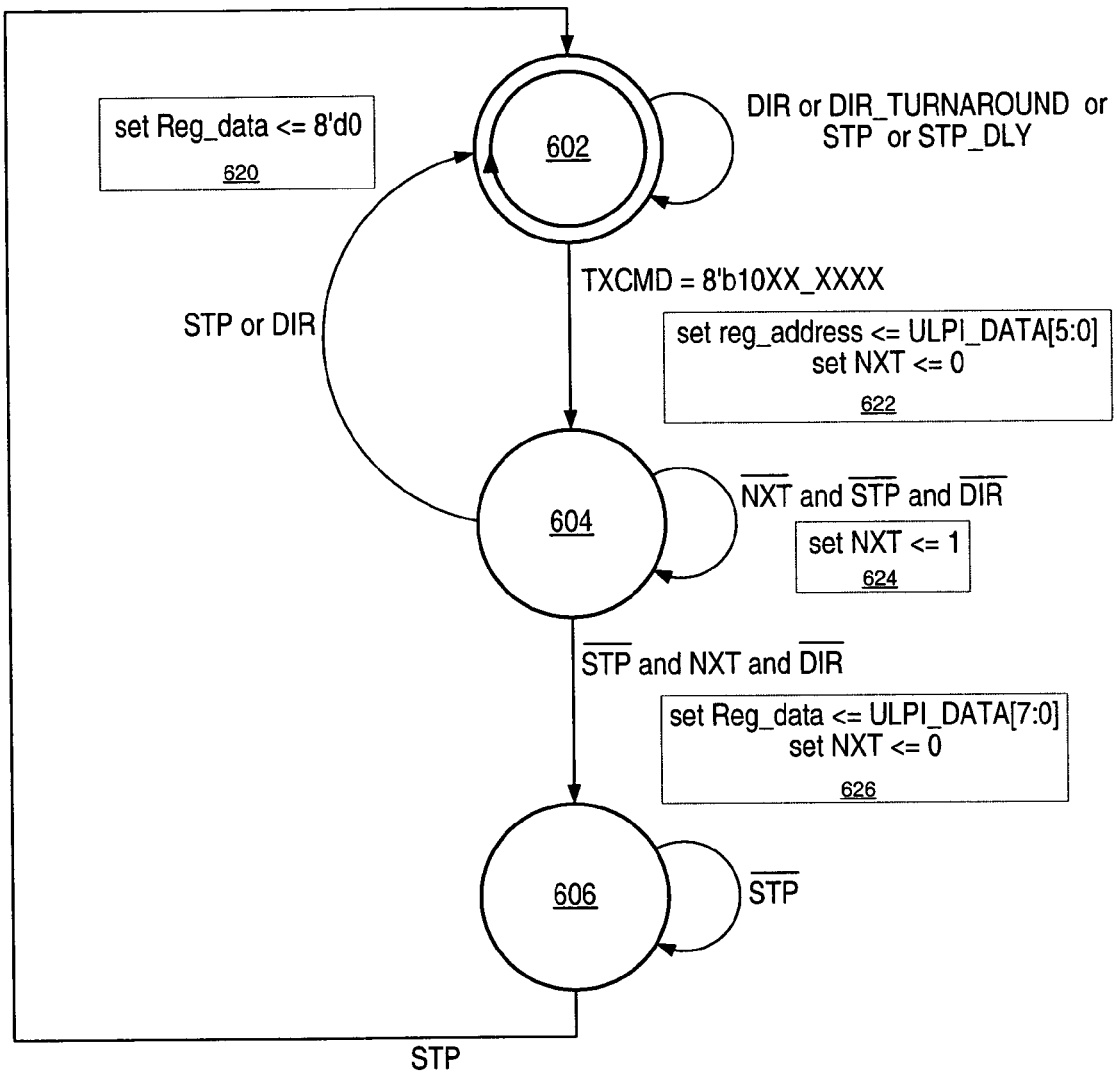
FIG. 6 shows a state diagram of an FSM used to monitor a register write sequence, according to one embodiment of the present invention.

More specifically, for the cases illustrated in FIG. 3 and/or FIG. 4, when DIR 110 and STP 108 are asserted simultaneously, additional steps may be required to determine when a write to the register has been interrupted. FIG. 6 illustrates a state diagram of one embodiment of the operation of FSM 130, which may perform the necessary steps to determine when a write to the register has been interrupted. In this embodiment, FSM 130 comprises three states; Register Write Idle state 602, Register Write Data state 604, and Register Write Complete state 606. State 602 may act as a reset state. In addition to the signals illustrated in the embodiment of FIG. 5, other signals may be used to implement functionality of transmitter/receiver 100 and FSM 130.

FSM 130 may remain in state 602 if any one or more of signals DIR (DIR 110 for the embodiment of FIG. 5), DIR_T-URNAROUND (data direction turnaround), STP (STP 108 for the embodiment of FIG. 5), and STP_DLY (a registered version of STP 108) are asserted. FSM 130 may be operated based on CLK 104 (of FIG. 5), which may be a 60 MHz clock, and STP_DLY in FIG. 6 may be registered on a rising edge of CLK 104.

While residing in state 602, if a Register Write command is recognized on data bus 112, that is, when data bits [7:6]=b'10, noted as TXCMD=8'b10xx_xxxx in FIG. 6, FSM 130 may transition to state 604. Upon transitioning from state 602 to state 604, the register address (Reg_addr 130 of FIG. 5) may be loaded with the value contents of data bits [5:0] and NEXT 106 may be set to zero, as indicated by set of commands 622 in FIG. 6. While in state 604, if either one or both of STP 108 and DIR 110 are asserted, the Register Write operation may be aborted and a transition may be made back to state 602. Upon transitioning back to state 602, the register data (Reg _data 122 of FIG. 5) may be reset, as indicated by command 620 in FIG. 6. Also while in state 604, if STP 108 and DIR 110 are both deasserted, NXT 106 may be asserted as indicated by command 624 in FIG. 6. Subsequently, when NXT 106 is asserted, and DIR 110 and STP 108 are both deasserted, FSM 130 may transition to state 606. Upon transitioning from state 604 to state 606, the register data (Reg_data 122 of FIG. 5) may be loaded with the value contents of all eight data bits, and NXT 106 may be deasserted, as indicated by set of commands 626 in FIG. 6.

FSM 130 may remain in state 606 until STP 108 is asserted. Once STP 108 is asserted, FSM 130 may transition back to state 602, thus completing the Register Write operation. As indicated by the state diagram of FIG. 6, asserting DIR 110 while in state 606 may not abort the Register Write operation. In one embodiment, the transitions as shown in the state diagram of FIG. 6 occur on the rising edge of CLK 104. Those skilled in the art will appreciate that alternate embodiments may be implemented such that transitions are triggered by means other than the rising edge of CLK 104.

While the preferred embodiments discussed in detail are illustrative of single data-rate operations, the principles described herein and applied to protect the Register Write operations may be equally applied to double data-rate operations, and data buses other than the one shown. By protecting the Register Write operations as described, operation of ULPI PHY 150 may become more predictable with the registers showing the last state due to a write or a power on state. Furthermore, the LINK may not have to read and keep an internal list of register states saving bus traffic. The LINK may also be enabled to re-try a Register Write operation that was aborted, when the LINK can re-schedule this operation, without a time constraint for a USB suspend or reset. In addition, interrupt information may not be lost due to an incorrect Register Write.

By protecting the Register Write operation, a current configuration of PHY 150 may also be protected such that the other end of the USB bus may not see a disconnect or another unexpected state, where an unexpected state may cause the other end of the USB bus to go into possible Host Negotiation Protocol (HNP), or simply disconnect or suspend. Preferred embodiments, as described herein, may also protect against noise causing a write to a register.

In intercepting DIR 110, and seeing when DIR 110 is interrupting a Register Write data transfer before DIR 110 is seen by the LINK, PHY 150 may control the data bus and make the decision on whether to use the data. Thus, various embodiments of the systems and methods described above may facilitate design of a ULPI PHY that protects a Register Write operation, especially in cases when a Register Write is interrupted.

Although the embodiments above have been described in considerable detail, other versions are possible. Numerous variations and modifications will become apparent to those skilled in the art once the above disclosure is fully appreciated. More specifically, while the embodiments described in detail pertain mostly to USB PHY, various embodiments of the system and method described herein may be applied to systems other than USB systems, should such systems require the monitoring of write operations and/or the maintaining of the integrity of registers that may be present in such systems. It is intended that the following claims be interpreted to embrace all such variations and modifications. Note the section headings used herein are for organizational purposes only and are not meant to limit the description provided herein or the claims attached hereto.

We claim:

1. A system comprising:
   an interface;
   a transmitter/receiver coupled to the interface; and
   a storage array coupled to the interface;
   wherein the transmitter/receiver is operable to:
      receive commands and data over the interface;
      transmit and/or receive control signals over the interface;
      decode the received commands to identify the received commands;
      monitor a write sequence whenever a respective one of the received commands is identified as a write command targeting the storage array, wherein the write sequence is initiated by the identified write command;
      discard the identified write command when a ULPI DIR signal issued by the transmitter/receiver is asserted before the end of a predetermined period of observation during the write sequence; and
      allow the write sequence to complete when a ULPI STP signal received by the transmitter/receiver and the ULPI DIR signal are not asserted before the end of the predetermined period of observation during the write sequence;
   wherein the predetermined period of observation is shorter than the duration of the write sequence.

2. The system of claim 1, wherein in monitoring the write sequence the transmitter/receiver is further operable to discard the write command when the ULPI STP signal is asserted during the write sequence.

3. The system of claim 1,
   wherein the interface comprises a bi-directional data bus and a plurality of control signal lines;
   wherein the control signals are transmitted and received over the control signal lines; and
   wherein the commands and the data are transmitted and received over the data bus.

4. The system of claim 1, wherein the transmitter/receiver is a USB transmitter/receiver, and the storage array is a register array.

5. The system of claim 1 further comprising a peripheral device, wherein the write command is issued by the peripheral device.

6. The system of claim 5, wherein the peripheral device is a ULPI LINK device.

7. The system of claim 1, wherein the transmitter/receiver comprises an FSM (Finite State Machine) and wherein said monitoring the write sequence is performed through the FSM.

8. The system of claim 7, wherein the FSM comprises:
   a Register Write Idle state;
   a Register Write Data state; and
   a Register Write Complete state.

9. The system of claim 8, wherein in discarding the write command, the FSM transitions from the Register Write Data state to the Register Write Idle state.

10. The system of claim 8, wherein in allowing the write sequence to complete, the FSM transitions from the Register Write Data state to the Register Write Complete state.

11. The system of claim 8, wherein in allowing the write sequence to complete, the FSM transitions from the Register Write Data state to the Register Write Complete state, then transitions from the Register Write Complete state to the Register Write Idle state.

12. The system of claim 1, wherein the system is a ULPI PHY.

13. A method for protecting a register write operation, the method comprising:
   receiving a command;
   decoding the command and in response to said decoding identifying the command as a write command initiating a register write sequence;
   generating a ULPI DIR signal;
   receiving a ULPI STP signal; and
   monitoring the register write sequence initiated by the write command, said monitoring comprising:
      discarding the write command when the ULPI DIR signal is asserted before the end of a predetermined period of observation during the register write sequence; and
      allowing the register write sequence to complete when a ULPI DIR signal and the ULPI STP signal are not asserted before the end of the predetermined period of observation during the register write sequence;
   wherein the predetermined period of observation is shorter than the duration of the write sequence.

14. The method of claim 13, wherein said monitoring further comprises discarding the write command when the ULPI STP signal is asserted during the register write sequence.

15. The method of claim 13,
   wherein said receiving is performed over a data bus; and
   wherein the ULPI DIR signal is indicative of a direction of signals traveling over the data bus.

16. The method of claim 13 further comprising receiving data over a data bus, wherein the write command is comprised in the data received over the data bus.

17. The method of claim 13 further comprising transmitting signals over a signal bus, wherein the ULPI DIR signal is one of the signals transmitted over the signal bus.

18. The method of claim 13 further comprising receiving signals over a signal bus, wherein the ULPI STP signal is one of the signals received over the signal bus.

19. The method of claim 13, wherein said monitoring is performed through an FSM.

20. A USB system comprising:
   a data bus;
   a signal bus;
   a USB transmitter/receiver coupled to the data bus and to the signal bus;
   a register array coupled to the data bus; and
   a ULPI LINK device coupled to the data bus and to the signal bus;
   wherein the USB transmitter/receiver is operable to:
      receive commands from the ULPI LINK device over the data bus;
      decode the received commands to identify the received commands;
      monitor a register write sequence whenever a respective one of the received commands is identified as a register write command targeting the register array, wherein the register write sequence is initiated by the identified register write command;
      discard the identified register write command when a ULPI DIR signal issued by the USB transmitter/receiver is asserted before the end of a predetermined period of observation during the register write sequence; and
      allow the write sequence to complete when a ULPI STP signal received by the USB transmitter/receiver and the ULPI DIR signal are not asserted before the end of the predetermined period of observation during the register write sequence;

wherein the predetermined period of observation is shorter than the duration of the write sequence.

21. The system of claim 20, wherein in monitoring the register write sequence, the USB transmitter/receiver is further operable to discard the register write command when the ULPI STP signal received by the USB transmitter/receiver is asserted during the register write sequence.

22. The system of claim 20, wherein the USB transmitter/receiver comprises an FSM (Finite State Machine), and wherein said monitoring the register write sequence is performed through the FSM.

23. The system of claim 22, wherein the FSM comprises:
a Register Write Idle state;
a Register Write Data state; and
a Register Write Complete state.

24. The system of claim 23, wherein in discarding the register write command, the FSM transitions from the Register Write Data state to the Register Write Idle state.

25. The system of claim 23, wherein in allowing the register write sequence to complete, the FSM transitions from the Register Write Data state to the Register Write Complete state.

26. The system of claim 23, wherein in allowing the register write sequence to complete, the FSM transitions from the Register Write Data state to the Register Write Complete state, then transitions from the Register Write Complete state to the Register Write Idle state.

* * * * *